United States Patent Office 3,453,271
Patented July 1, 1969

3,453,271
**DI-SUBSTITUTED 5-NORBORNENE
2,3-DICARBOXIMIDES**
Joseph Albert Meschino, North Wales, Richard Joseph
Mohrbacher, Fort Washington, and Chris Royce Rasmussen, Ambler, Pa., assignors to McNeil Laboratories,
Inc., a corporation of Pennsylvania
No Drawing. Continuation-in-part of application Ser. No.
559,109, June 21, 1966. This application May 2, 1967,
Ser. No. 635,369
Int. Cl. C09b 23/04; C07d 27/54, 27/28
U.S. Cl. 260—240                                1 Claim

ABSTRACT OF THE DISCLOSURE

The compounds are of the class of 5,6(and 1,5)-di-($R_4$-$R_5$ - hydroxymethyl)-7-($R_1$-$R_2$-methylene)-N-R-5-norbornene-2,3-dicarboximides useful for their anti-arrhythmic activity.

---

This is a continuation-in-part of our copending application, Ser. No. 559,109, filed June 21, 1966, now abandoned.

This invention relates to novel organic chemical compounds and, more particularly, to novel di-substituted 5-norbornene-2,3-dicarboximides which may be structurally represented by the following formulas:

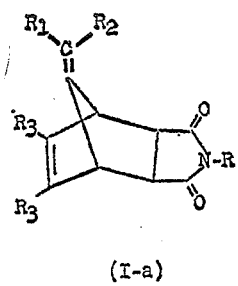

(I-a)

and

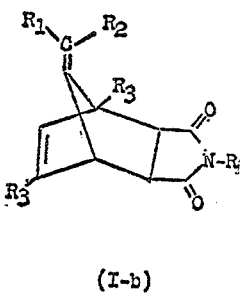

(I-b)

wherein R is a member selected from the group consisting of hydrogen, lower alkyl, aralkyl, dialkylaminoalkyl and aryl; $R_1$ and $R_2$ are the same or different member selected from the group consisting of hydrogen, aryl, including substituted aryl, and heteroaryl, including substituted heteroaryl, provided that at least one of said $R_1$ and $R_2$ is other than hydrogen; and $R_3$ is an $R_4R_5C(OH)$—group wherein $R_4$ and $R_5$ have the same definition and limitation as previously described for $R_1$ and $R_2$, respectively. Among the preferred aryl and substituted aryl are, respectively, phenyl and halophenyl, nitrophenyl and the like. Among the heteroaryl and substituted heteroaryl are pyridyl, quinolyl, thienyl, lower alkyl-pyridyl and the like, the preferred heteroaryl being 2-pyridyl. The compounds of Formula I-a may be denoted as 5,6-di-($R_4$-$R_5$-hydroxymethyl) - 7 - ($R_1$-$R_2$-methylene)-N-R-5-norbornene-2,3-dicarboximides; the compounds of Formula I-b as 1,5-di-($R_4$-$R_5$ - hydroxymethyl) - 7 - ($R_1$-$R_2$-methylene)-N-R-5-norbornene-2,3-dicarboximides.

The subject compounds may be prepared by condensation of an appropriately substituted fulvene of Formula II-a or Formula II-b and an appropriate maleimide III under Diels-Alder conditions. The preparation of the starting fulvenes II-a and II-b is described in copending application Ser. No. 559,112, filed concurrently herewith. N-alkyl, N-aralkyl and N-aryl maleimides are generally prepared by reaction of maleic anhydride with an appropriate alkylamine, aralkylamine or arylamine, respectively, followed by dehydration of the resulting N-substituted maleamic acid. The reaction schemes may be illustrated as follows, the symbols R, $R_1$, $R_2$ and $R_3$ being as heretofore described:

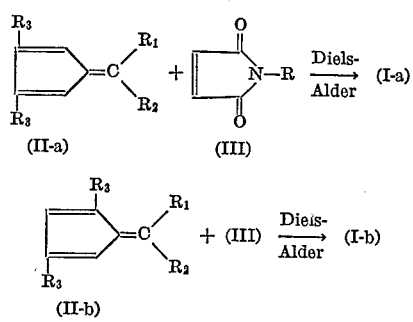

An alternative method of preparing the N-alkyl derivatives of this invention and the N-dialkylaminoalkyl derivatives also, is by introduction of the alkyl or dialkylaminoalkyl group onto the unsubstituted imido nitrogen of the subject 5,6- or 1,5-di-($R_4$-$R_5$-hydroxymethyl)-7-($R_1$-$R_2$-methylene)-5-norbornene,-2,3-dicarboximides by, respectively, conventional alkylation with an appropriate lower alkyl halide, e.g., methyl iodide, ethyl bromide, butyl bromide and the like, or with a dialkylaminoalkyl halide, e.g., dimethylaminopropyl chloride, diethylaminoethyl chloride and the like. The alkylation may be carried out in a variety of polar or nonpolar solvents such as the lower alkanols, e.g., methanol, ethanol, isopropanol and the like; ethers; dimethylformamide; or aromatic hydrocarbons such as benzene, toluene, xylene and the like. The alkylation may also be carried out in the presence of an alkali or alkaline earth metal hydroxide or alkoxide.

The subject compounds have useful pharmacological and pharmaceutical applications in view of their anti-arrhythmic activity. This activity is exemplified with 1,5-bis($\alpha$-hydroxybenzyl)-7-benzylidene-5-norbornene - 2,3-dicarboximide which inhibits oubain-induced arrythmias in dogs at doses ranging from 1 to 20 mg./kg. administered intravenously. The subject compounds can be administered in conventional pharmaceutical formulations for oral and parenteral usages.

Due to the structural configuration of the subject compounds, it is evident that their existence in the form of several stereoisomers is possible. It is naturally intended that all such isomers are included within the scope of this invention.

The following examples are intended to illustrate, but not to limit, the scope of the present invention.

EXAMPLE I

To a solution of 6.9 g. (0.3 g. atom) of sodium dissolved in 150 ml. of absolute ethanol is added 21 g. (0.32 mole) of freshly distilled cyclopentadiene. This solution, under nitrogen, is added dropwise over 30 min. to a solution of 63.6 g. (0.60 mole) of benzaldehyde in 450 ml. of absolute ethanol at 0–3° C. with stirring. After stirring 3 hrs. at 3° C., the mixture is filtered to give about 11.9 g. of orange crystals. Two recrystallizations from benzene yields crystalline 1,3-bis(α-hydroxybenzyl)-6-phenyl-fulvene; M.P. 180–182° C.

$\lambda_{max.}^{KBr}$ 2.98, 6.18μ; $\lambda_{max.}^{CH_3OH}$ 316 mμ (ε 25,200)

*Analysis.*—Calcd. percent for $C_{26}H_{22}O_2$: C, 85.21; H, 6.05. Found: C, 85.18; H, 5.79.

The n.m.r. spectrum (DMF-$d_7$) exhibits the following peaks: singlets at 5.60, 5.88, 6.30, 6.55 δ (four vinyl and methine protons) and a series of multiplets from 7.0 to 7.62 δ (fifteen phenyl and one vinyl protons).

EXAMPLE II

To a solution of 10 g. (0.05 mole) of di-2-pyridyl ketone and 0.7 g. (0.03 mole) of sodium in 50 ml. of absolute ethanol, all at —5° to —10° C., is added over a 15 minute period 2 g. (0.03 mole) of cyclopentadiene. Stirring at this temperature is continued for a period of about 5 hours after which 3.2 g. (0.05 mole) of acetic acid is added. After standing at room temperature for several hours, the resulting precipitate is collected by filtration. Purification is effected by boiling the product in ethyl acetate, it being insoluble in this solvent. The product, 2,3-bis(di-2-pyridylhydroxymethyl)-6,6-di-2-pyridyl-fulvene, melts with decomposition at about 225° C.

*Analysis.*—Calcd. percent for: $C_{38}H_{28}N_6O_2$: N, 13.99. Found: N, 13.93.

EXAMPLE III

To an ethereal solution of ethyl magnesium bromide prepared from 4.86 g. (0.2 g. atom) of magnesium and 25 g. (0.229 mole) of ethyl bromide is added 125 ml. of dry benzene. Ether is distilled until the boiling point of the mixture reaches 60–63° C. Then 13.2 g. (0.2 mole) of freshly distilled cyclopentadiene is added and the mixture is refluxed for six hours. The resultant cyclopentadienyl magnesium bromide solution is cooled under an atmosphere of dry nitrogen to below 0° C. and 36.4 g. (0.2 mole) of benzophenone in 100 ml. of ether is added with stirring. After stirring for an additional 30 min., the mixture is hydrolyzed with excess ice water containing 12.0 g., (0.2 mole) of glacial acetic acid. The organic phase is separated and the aqueous phase extracted with three 150–200 ml. portions of ether. The combined extracts are washed with dilute sodium bicarbonate solution and dried over sodium sulfate. Most of the solvent is evaporated in vacuo and the resultant semi-crystalline mass crystallizes upon addition of hexane. The solid is filtered, washed with pet ether, and dried to yield α-cyclopentadienyl-α-phenyl-benzyl alcohol; M.P. 119–123° C.

EXAMPLE IV

Di-2-pyridyl ketone, 73.2 g. (0.4 mole) is dissolved in 300 ml. of absolute ethanol and then cooled to —12° C. in an ice-salt bath. Twenty milliliters of ethanol containing 0.23 g. (0.01 g. atom) of dissolved sodium is then added and a solution of 23.8 g. (0.1 mole) of α-cyclopentadienyl-α-phenyl-benzyl alcohol in 200 ml. of absolute ethanol is added over a 1.5 hr. period. Stirring is continued overnight, the temperature not exceeding 9° C. The resulting solid is removed by filtration and dried; M.P. 232–244° C. dec. Two recrystallizations from chloroform-methanol-ethanol gives 2,3-bis(di-2-pyridylhydroxymethyl)-6,6-diphenyl-fulvene; M.P. 252–254° C. sl. dec.

$\lambda_{max.}^{MeOH}$ 252 shil. (ε 23,500), 255 (ε 24,000), 260 shl. (ε 23,200) and 341 mμ (ε 28,000)

*Analysis.*—Calcd. percent for: $C_{40}H_{30}N_4O_2$(598.67): C, 80.24; H, 5.05; N, 9.36. Found: C, 80.50, 80.13; H, 5.25, 5.24; N, 9.54, 9.09.

EXAMPLE V

A solution of 2 g. (0.00547 mole) of 2,3-bis(α-hydroxybenzyl)-6-phenyl-fulvene and 0.5 g. (0.00515 mole) of maleimide in 100 ml. of benzene is heated under reflux. A white solid begins precipitating after about 3½ hrs. of heating. After heating for a total of 15 hrs., the mixture is cooled to 5° C. and filtered to give 0.6 g. of white solid. Recrystallization from emthanol:water (1:3) gives 0.15 g. of white crystals, 1,5-bis(α-hydroxybenzyl)-7-benzylidene-5-norbornene-2,3-dicarboximide; M.P. 195–196° C.

*Analysis.*—Calcd. percent for: $C_{30}H_{25}NO_4$: C, 77.73; H, 5.44; N, 3.02. Found: C, 77.51; H, 5.44; N, 3.22.

The nuclear magnetic resonance (n.m.r.) spectrum of the product in dimethylformamide-$d_7$ is consistent with the 1,5-bis(α-hydroxybenzyl-7-benzylidene-5-norbornene-2,3-dicarmoximide structure and exhibits an ABC pattern ranging from 3.2 to 40.8δ (three alphatic protons); a doublet at 5.15δ, a singlet at 5.75δ and a singlet at 6.37δ with integrated intensities of 1,1 and 2, respectively (two unassigned methine and two unassigned vinyl protons). The aromatic region (6.42–7.86δ) exhibits fifteen protons.

EXAMPLE VI

A solution of 11.97 g. (0.02 mole) of 2,3-bis(di-2-pyridylhydroxymethyl)-6,6-diphenyl-fulvene and 2.0 g. (0.02 mole) of maleimide in 500 ml. of benzene is allowed to reflux for about 17 hrs. Two more grams of maleimide are then added and the solution is concentrated to about one-half its original volume. Refluxing is continued until a considerable amount of white solid has separated. The solid, 5,6-bis(di-2-pyridylhydroxymethyl)-7-(diphenylmethylene)-5-norbornene-2,3 - dicarboximide, is collected and the filtrate is again concentrated to about 50 ml. and allowed to reflux overnight giving an additional crop of material of identical M.P. (270–272° C. dec.) as the initial crop. The combined crops are recrystallized by dissolution in about 200 ml. of dioxane followed by concentration in vacuo to about 30 ml., and then 150 ml. of methanol is added. The resulting solid melts at 272–273° C. (dec.).

*Analysis.*—Calcd. percent for: $C_{44}H_{33}N_5O_4$(695.78): C, 75.96; H, 4.78; N, 10.07. Found: C, 75.60, 75.36; H, 4.97, 5.02; N, 10.00, 10.07.

Vigorous drying at 110° C. and 0.02 mm. could not remove about one-eighth mole (1.56% by weight) of dioxane, as determined by n.m.r.

EXAMPLE VII

To 50 ml. of a solution of 5,6-bis (di-2-pyridylhydroxymethyl)-7-(diphenylmethylene)-5-norbornene - 2,3 - dicarboximide, 6.0 g. (0.01 mole), in dimethylformamide, is added 0.24 g. (0.01 mole) of sodium hydride. After dissolution of the hydride is complete, 1.09 g. (0.01 mole) of ethyl bromide is added at room temperature with stirring. Stirring is continued for 30 min., then the mixture is warmed on a steam bath for 1 hr. Solvent removed in vacuo gives a residue containing N-ethyl-5,6-bis(di-2-pyridylhydroxymethyl)-7 - (diphenylmethylene)-5-norbornene-2,3-dicarboximide.

EXAMPLE VIII

By repeating the procedure of Example VII except that an equivalent quantity of n-butyl bromide is used in place of the ethyl bromide used therein, the corresponding N-n-butyl-5,6 - bis - (di-2-pyridylhydroxymethyl)-7-(diphenylmethylene)-5-norbornene-2,3 - dicarboximide is obtained.

EXAMPLE IX

A. A solution of 6.0 g. (0.01 mole) of 5,6-bis(di-2-pyridylhydroxymethyl)-7-(diphenylmethylene) - 5 - norbornene-2,3-dicarboximide and 1.74 g. (0.01 mole) of N-phenylmaleimide in a minimal amount of benzene is heated under reflux for 2 days. Solvent removal in vacuo gives a residue containing N-phenyl-5,6-bis(di-2-pyridylhydroxymethyl)-7-(diphenylmethylene)-5 - norbornene-2,3-dicarboximide.

B. The procedure of Example IX–A is followed except that an equivalent quantity of 1,5-bis(α-hydroxybenzyl)-

7-benzylidene-5-norbornene-2,3-dicarboximide is used as the starting norbornene dicarboximide reactant to yield the corresponding N-phenyl-1,5-bis(α-hydroxybenzyl)-7-benzylidene-5-norbornene-2,3-dicarboximide.

EXAMPLE X

A mixture of 20 g. (0.033 mole) of 2,3-bis(di-2-pyridylhydroxymethyl)-6,6-di-2-pyridyl-fulvene and 4.8 g. (0.048 mole) of maleimide in 150 ml. of xylene is stirred and refluxed for several hours. The resulting precipitate is collected by filtration and is recrystallized from chloroform-petroleum ether to give 5,6-bis(di-2-pyridylhydroxymethyl)-7-(di-2-pyridylmethylene)-5 - norbornene - 2,3-dicarboximide; M.P. 265° C. (dec.) whose structure is confirmed by nuclear magnetic resonance spectroscopy.

*Analysis.*—Calcd. percent for: $C_{42}H_{31}N_2O_4$: N, 14.05. Found: N, 13.98.

EXAMPLE XI

A. By repeating the respective alkylation procedures of Examples VII and VIII with an equivalent quantity of the norbornene dicarboximide obtained from Example IX, there are obtained, as respective products, the N-ethyl and N-n-butyl derivatives of 5,6-bis(di-2-pyridylhydroxymethyl)-7-(di-2-pyridylmethylene) - 5 - norbornene-2,3-dicarboximide.

B. The procedure of Example IX is followed except that an equivalent quantity of the norbornene dicarboximide obtained from Example IX is used in place of the norbornene dicarboximide used therein to yield the corresponding N-phenyl-5,6-bis(di-2 - pyridyl - hydroxymethyl)-7-(di-2-pyridylmethylene) - 5 - norbornene-2,3-dicarboximide.

C. The alkylation procedures of Examples VII and VIII are repeated using an equivalent quantity of 1,5-bis(α-hydroxybenzyl)-7-benzylidene-5-norbornene - 2,3-dicarboximide as the strating norbornene dicarboximide reactant to yield, as respective products, the N-ethyl and N-n-butyl derivatives of 1,5-bis(α-hydroxybenzyl) - 7-benzylidene-5-norbornene-2,3-dicarboximide.

What is claimed is:

1. A chemical compound selected from the group consisting of 1,5-bis(α-hydroxybenzyl)-7-benzylidene-5-norbornene-2,3-dicarboximide and the N-lower alkyl and N-phenyl derivatives thereof.

References Cited

UNITED STATES PATENTS 3,311,634    3/1967    Poos _____ 260—294

HENRY R. JILES, *Primary Examiner.*

ALAN L. ROTMAN, *Assistant Examiner.*

U.S. Cl. X.R.

260—287, 295, 296, 326.5, 326.85, 329, 332.2, 999

PO-1050
(5/69)

UNITED STATES PATENT OFFICE
CERTIFICATE OF CORRECTION

Patent No. 3,453,271            Dated July 1, 1969

Inventor(s) Joseph A. Meschino et al

It is certified that error appears in the above-identified patent and that said Letters Patent are hereby corrected as shown below:

In Column 4, line 3, the word "emthanol" should read -- methanol --.
In Column 4, line 13, the number "40.8" should read -- 4.08 --.

SIGNED AND
SEALED

NOV 4 1969

(SEAL)
Attest:

Edward M. Fletcher, Jr.
Attesting Officer

WILLIAM E. SCHUYLER, JR.
Commissioner of Patents